No. 657,148. Patented Sept. 4, 1900.
W. R. WOOD.
APPARATUS FOR HANDLING LOCOMOTIVES OR OTHER HEAVY BODIES.
(Application filed Nov. 15, 1897. Renewed July 21, 1900.)
(No Model.) 4 Sheets—Sheet 2.
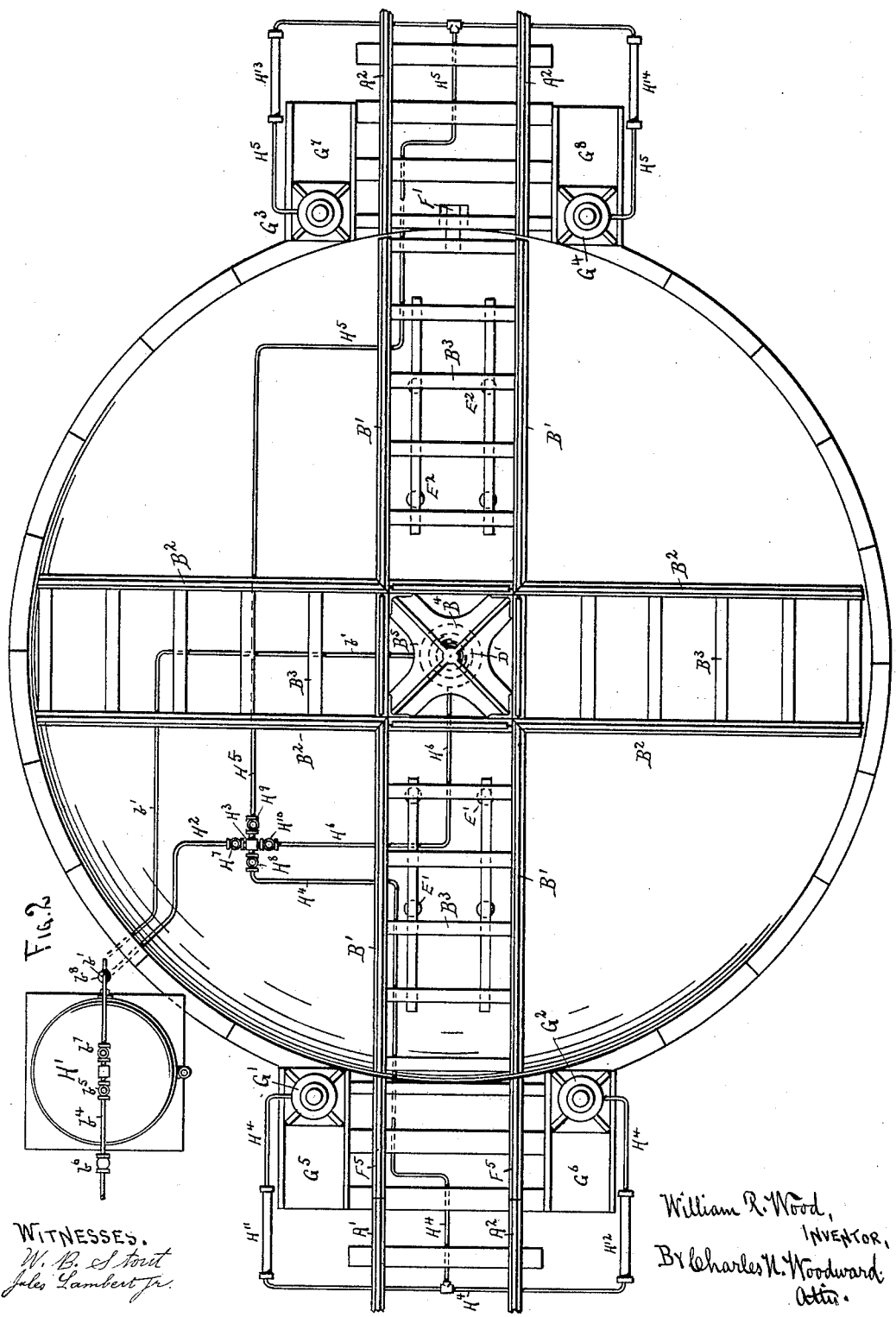

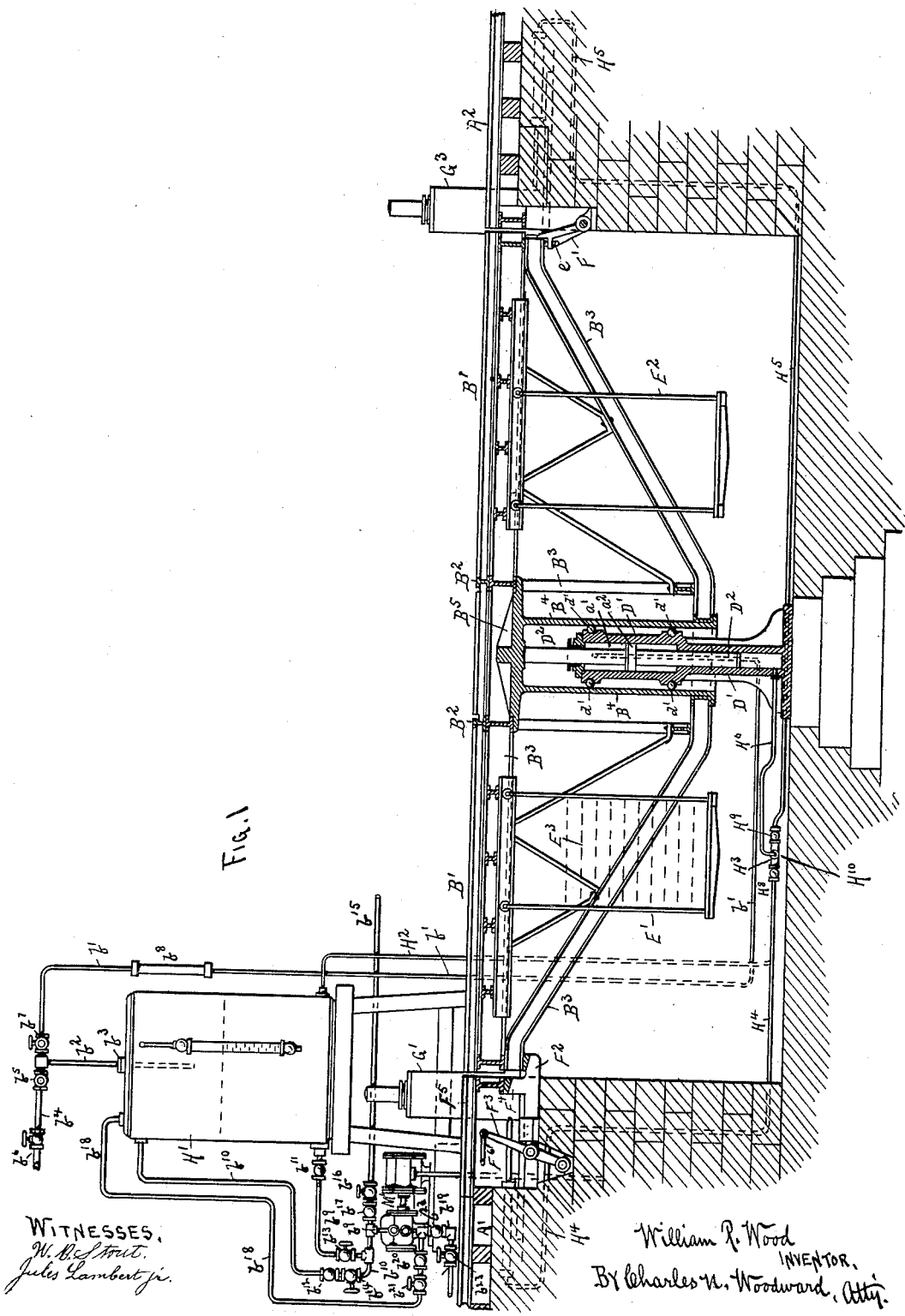

No. 657,148. Patented Sept. 4, 1900.
W. R. WOOD.
APPARATUS FOR HANDLING LOCOMOTIVES OR OTHER HEAVY BODIES.
(Application filed Nov. 15, 1897. Renewed July 21, 1900.)
(No Model.) 4 Sheets—Sheet 3.
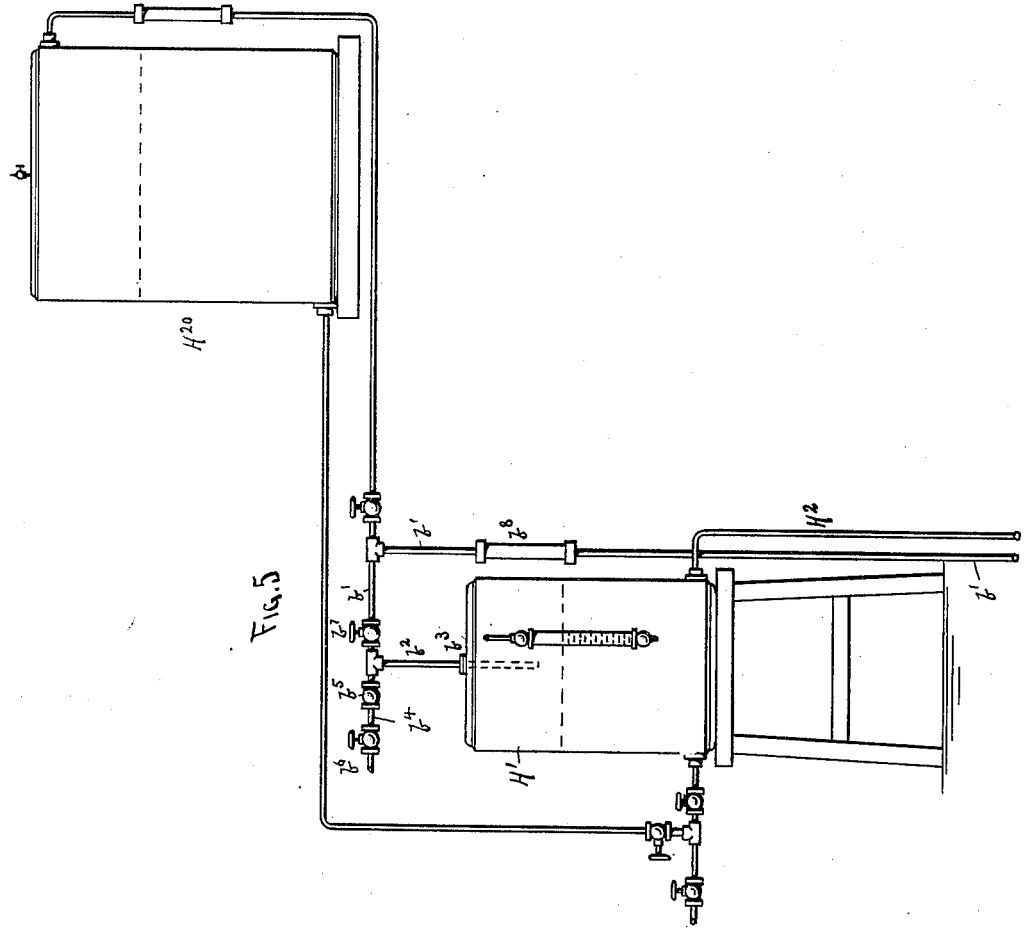
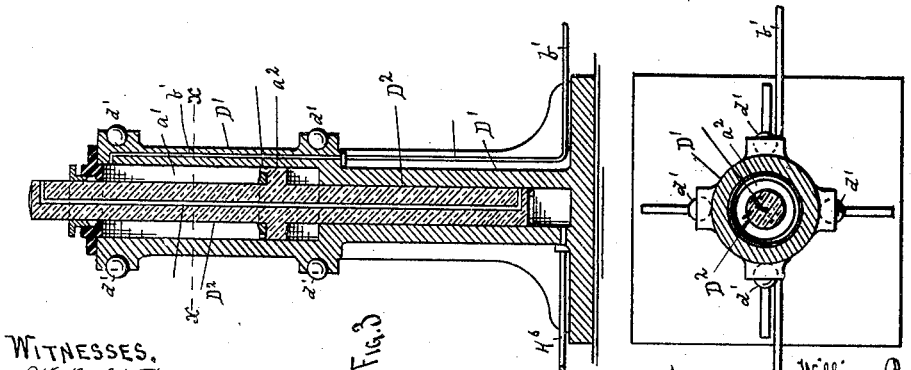
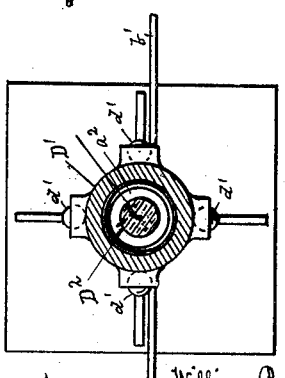

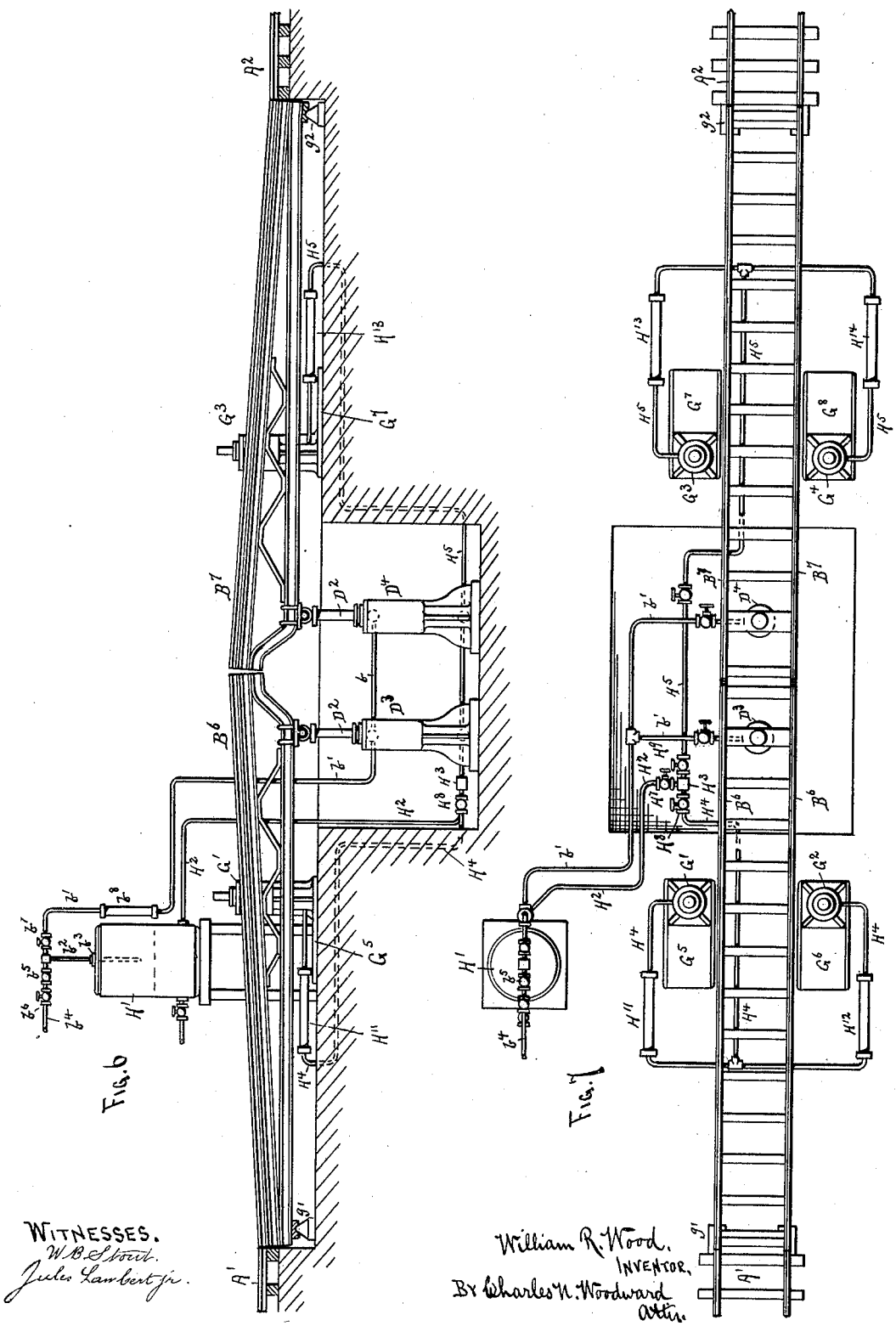

UNITED STATES PATENT OFFICE.

WILLIAM R. WOOD, OF ST. PAUL, MINNESOTA.

APPARATUS FOR HANDLING LOCOMOTIVES OR OTHER HEAVY BODIES.

SPECIFICATION forming part of Letters Patent No. 657,148, dated September 4, 1900.

Application filed November 15, 1897. Renewed July 21, 1900. Serial No. 24,415. (No model.)

*To all whom it may concern:*

Be it known that I, WILLIAM R. WOOD, a subject of the Queen of Great Britain and Ireland, (but having declared my intention of becoming a citizen of the United States,) residing at St. Paul, in the county of Ramsey and State of Minnesota, have made certain new and useful Improvements in Apparatus for Handling Locomotives or other Heavy Bodies, of which the following is a specification.

This invention relates to apparatus for handling locomotives, coaches, cars, and other heavy bodies; and it consists in the construction, combination, and arrangement of parts, as hereinafter shown and described, and specifically pointed out in the claims.

In this invention is comprised a series of appliances, preferably operated by hydraulic or pneumatic power or a combination of both, arranged to support and elevate and depress the body of the locomotive or other object to be handled and an adjustable platform or table adapted to be supported and elevated or depressed, whereby a portion of the locomotive or other object may be separated from the remaining portion.

In this invention is comprised further means whereby in the actuating appliances the weight of one part of the article being handled is utilized to assist in elevating or depressing the other portion of the object to be handled.

This invention will be found particularly advantageous in handling locomotives when the upper works, including the boiler and frame, are to be separated from the running-gear or trucks, and for the purpose of illustrating I have shown in the drawings the apparatus arranged for handling locomotives.

Figure 1 represents a sectional side elevation, and Fig. 2 represents a plan view, of one form of the apparatus. Fig. 3 is an enlarged sectional elevation of one of the hydraulic "jacks," and Fig. 4 is a cross-sectional view of the same on the line $x\ x$ of Fig. 3. Fig. 5 is a diagrammatic view of the compressed fluid and air apparatus, illustrating a modification in the construction. Fig. 6 is a sectional side elevation, and Fig. 7 is a plan view of the same, illustrating a modification in the construction.

The different modifications shown illustrate the manner of using the adjustable platform or tables in different localities and under different circumstances, but they all comprise the same general features and accomplish substantially the same results by substantially the same means.

In Figs. 1 and 2, $A'\ A^2$ represent sections of the main track leading to the appliances for handling the locomotives or other objects. $B'\ B^2$ are two sections of track arranged at right angles to each other and supported by a suitable truss-frame $B^3$ and a central tubular section $B^4$, the latter fitting over and supported by a "hydraulic jack," as shown. This hydraulic jack consists of the shell or casing $D'$ and the "ram" or piston $D^2$, the piston bearing beneath the top $B^5$ of the tubular center $B^4$. By this means the crossed tracks $B'\ B^2$ are revoluble upon the piston $D^2$ as a center, forming a turn-table-like structure. The ends of the track-sections $B'\ B^2$ are arranged to "register" with the track-sections $A'\ A^2$ as the sections are revolved upon the central point $D^2$, so that the locomotive or other structure can be run upon either of the track-sections $B'$ or $B^2$. The casing $D'$ of the hydraulic jack is formed with its upper part provided with a larger bore than the lower part, as at $a'$, and with a piston-head $a^2$ upon the piston-rod $D^2$ within this enlarged bore, as shown, and with a pipe connection $b'$, leading to the interior of the casing $D'$ above the piston-head, so that the compressed air or liquid may be supplied above the piston-head, if required, the object to be hereinafter explained. In Fig. 3 a port or conduit $g$ is shown running down through the piston $D^2$, with its lower end turned off and passing out through the side of the piston and ending against the interior of the cylinder $D'$, while the upper end of the port opens out into the air at the upper end of the piston above the cylinder, as shown. The function of this port is to form a vent or means for the escape of any leakage which may occur around the lower section of the piston, carry it away, and prevent it from crowding up past the piston and interfering with the action of the upper part of the piston. The casing $D'$ will be preferably provided with antifriction guide rollers or balls $d'$, so as to reduce the friction. Means will be provided for counterweighting the crossed tracks, as by suspended frames E' E² to support weights (shown only by dotted lines E³) and adjustable laterally, whereby the load may be shifted to adapt it to the position and weight of the locomotive or other object above, so that the turn-table-like structure may not be overweighted on one side. Means will also be provided for supporting the ends of the track-sections B' B² when they are next the track-sections A' A², so that the weight of the locomotive or other object will not weigh the turn-table-like structure downward when first running it upon the sections B' B². In Fig. 1 at the right I have shown this support in the form of a "strut" or pivoted brace F', with a set-screw $e$, by which the bearing-point may be adjusted, while at the left the support is in the form of a "shoe" formed with a wedge or inclined plane portion F², adapted to be inserted beneath the ends of the sections B' or B² and actuated by a lever F³. In this construction also the shoe is provided with another inclined surface F⁴, adapted to act beneath loose rail-sections F⁵ at the ends of the rail-approach A', so that the rail-approach A' and section B' or B² will always be retained at exactly the same level. By this means no unevenness or irregularity between the ends of the rails A' and B' or B² will ever occur, as the double inclined shoe will always keep the points of union at exactly the same level. The operating-lever F³ for the shoe is shown provided with a rod F⁶, to which the air-pump may be connected, so that the pneumatic or hydraulic power may be utilized to actuate the shoe. G' G² G³ G⁴ are four hydraulic jacks located opposite each corner of the locomotive or other object to be handled when in position upon the track-sections B' B² and set adjustably upon bases G⁵ G⁶ G⁷ G⁸, so that the jacks may be adjusted to adapt them to different lengths of the locomotives or other articles being handled. H' is a tank in which the liquid from which the hydraulic jacks are supplied is retained under pressure and from which it is fed by a pipe H² to a central distributer H³ and from which it leads by pipes H⁴ H⁵ to the jacks G' G² G³ G⁴ and by pipe H⁶ to the central jack D' D², as shown, the piping being provided with suitable regulating and shut-off valves H⁷ H⁸ H⁹ H¹⁰, so that the liquid may be conducted to any desired jack. The piping H⁴ H⁵ will be supplied with "slip-joints" H¹¹ H¹² H¹³ H¹⁴, so that when the jacks G' G² G³ G⁴ are adjusted the piping will not be disturbed thereby. When the article to be handled is in position upon the track-sections B' B², cross-bars will be placed across beneath the framework at the ends and resting upon the piston-rods or rams of the jacks G' G² G³ G⁴, so that the body of the object can be supported from the jacks. When locomotives or cars are thus supported, the supports for the trucks or running-gear will be removed, so that when the framework B' B² is lowered by allowing the liquid to be withdrawn from the jack D' D² the trucks or running-gear will be detached from the upper framework of the locomotive or other object and be carried downward with the framework B' B². In dismembering locomotives or cars false or supplemental trucks or supports are provided to be used for temporarily carrying the loads, and such supplemental trucks will be placed upon the branch-track section B² before the object to be handled is placed in position upon the track-section B'. Then when the turn-table-like structure is depressed and turned one-fourth around the temporary trucks will be swung around beneath the object above, while the trucks or driving-wheels which have just been removed will be swung around out of the way. Then when the turn-table-like structure is again elevated by the jack D' D² the temporary trucks or supports will be placed in position beneath the locomotive or other object being handled. When the trucks are to be replaced beneath the locomotive, the trucks are run upon one of the side branches B' or B² or the turn-table-like structure turned one-fourth around to cause the other sections B' or B² to register with the tracks A' A². The locomotive upon its temporary trucks is then run upon the framework B' B² and elevated by the jacks G' G² G³ G⁴ and the sections B' B² lowered down, as before described, and then by swinging the frame B' B² around and elevating it the trucks will be replaced beneath the locomotive. The structure being handled can then be run off from the track-sections B' B² and the turn-table-like structure returned to its former position and the drive-wheels or trucks removed. When the liquid is to be applied to the jack D' D² to elevate the trucks supported by the frame B' B², if the valves H⁷ be closed and the valves H⁸ H⁹ H¹⁰ be left open the weight of the locomotive or other object supported by the four jacks G' G² G³ G⁴ will by compressing the liquid beneath their respective pistons cause it to flow into the central jack D' D² and increase the pressure therein and assist the central jack to elevate its load. Thus the weight of the locomotive in moving downward may be utilized to materially assist in the elevation of the frame B' B² and the load carried by it. It must be borne in mind that the locomotive has been elevated by and is now supported upon the jacks G' G² G³ G⁴ above its normal position, while the trucks of the locomotive are supported upon the frame B' B² below their normal position, and in bringing them together the locomotive has to move downward and the trucks have to move upward. It will be thus understood that if the four corner jacks be connected by the piping to the central jack the weight of the locomotive, which is of course much greater than the frames B' B² and the trucks carried thereby, will assist the central jack in elevating its load. By manipulating the valves H⁷ H⁸ H⁹ H¹⁰ the pressure may be perfectly controlled and regulated, and the weight of the different parts of the object being handled added to the pressure in the different jacks to increase their efficiency. As before stated, the tank H' contains the supply of liquid for the jacks under pressure, and this pressure is usually attained by compressed air forced in above the liquid, and the pipe $b'$ leads from the top of this tank to the interior of the central jack D' into the enlarged upper portion above the piston-head $a^2$, so that a pressure of compressed air may be exerted in a downward direction upon the piston when the liquid below the piston is connected by the piping to the jacks $G'$ $G^2$ $G^3$ $G^4$, so that the air-pressure in the tank H' may be added to the weight of the frame $B'$ $B^2$ and the load carried thereby to increase the pressure in the jacks $G'$ $G^2$ $G^3$ $G^4$ to that extent. The pipe $b'$ can thus be employed only when the jacks D' and $G'$ $G^2$ $G^3$ $G^4$ are so connected as to utilize their combined pressure to assist in elevating the locomotive or other object.

In Figs. 6 and 7 the platform or table is shown in two parts $B^6$ $B^7$, with their adjacent ends adapted to be elevated and depressed, preferably by hydraulic or pneumatic jacks $D^3$ $D^4$, similar to the jacks D' $D^2$, and with the outer ends of the tables supported upon centers $g'$ $g^2$, the outer ends being thereby always held level with the approaches $A'$ $A^2$. The supporting-jacks $G'$ $G^2$ $G^3$ $G^4$ are arranged in the same manner in all the modifications shown. When the modification shown in Figs. 6 and 7 is employed, the adjacent ends of the table-sections $B^6$ $B^7$ will be first elevated by the jacks $D^3$ $D^4$, as in Fig. 6, and the locomotive or other object to be handled will be run upon the tables. The jacks $G'$ $G^2$ $G^3$ $G^4$ will be then brought into action as before described and the tables $B^6$ $B^7$ depressed, which will carry the released trucks or drive-wheels downward from beneath the locomotive or car and leave the trucks or drive-wheels free to be run out from beneath the locomotive or car and the temporary trucks run in in their places, and then when the table-sections $B^6$ and $B^7$ are again elevated the temporary trucks will be placed in position. The tank H', piping $H^2$, $H^4$, $H^5$, and $H^6$, and the valves $H^7$, $H^8$, $H^9$, and $H^{10}$ are substantially the same in the modification shown in Figs. 6 and 7 as in the modification shown in Figs. 1 and 2, and like letters of reference are employed to designate corresponding parts in all the figures. In the top of the tank H' a pipe $b^2$ is inserted through a stuffing-box $b^3$, the branch $b^2$ being connected to the pipe $b'$, as shown. Another branch $b^4$ is connected into the branch $b^2$, so that compressed air may be supplied to the upper part of the tank above the water from the ordinary pneumatic system when such system is in use instead of by the pump M', if required. The piping $b^2$ $b^4$ is supplied with a check-valve $b^5$ and shut-off valves $b^7$ $b^6$, as shown, so that by closing the valve $b^7$ air may be forced into the tank H' through the pipes $b^2$ $b^4$. Thus a pressure of air may be forced into the tank above the water to either increase the hydraulic pressure or to be employed for use in pneumatic apparatus, as may be required. The pipe $b^2$, passing through the stuffing-box $b^3$ into the interior of the tank H', is thus movable perpendicularly, so that the lower end of the pipe $b^2$ may be immersed in the water in the tank. The pipe $b'$ is provided with a slip-joint $b^8$, so that the perpendicular movement of the pipe $b^2$ and its attachments will not disturb the pipe connections below the line of the tank. By thus adjusting the pipe $b^2$ downward into the water in the tank this pipe may be utilized to force water into or out of the tank, so that the hydraulic force instead of air may be employed. In Fig. 1 a pump M' is shown connected to supply the bottom of the tank H' by a pipe $b^9$ and also supply the top of the tank by a pipe $b^{10}$, the pipes $b^9$ $b^{10}$ having each a check-valve $b^{11}$ $b^{12}$ and shut-off valves $b^{13}$ $b^{14}$, so that the pump may be connected to either the top or bottom of the tank. The pump M' is also provided with a branch $b^{15}$, having a check-valve $b^{17}$ and shut-off valve $b^{16}$, so that the usual shop-service piping may be supplied from the same pump M'. $b^{18}$ is a pipe connecting the top of the tank H' with the intake-pipe $b^{19}$ of the pump M' and provided with check-valve $b^{20}$ and shut-off valve $b^{21}$, while the intake-pipe $b^{19}$ is also provided with a check-valve $b^{22}$, whereby provision is made for utilizing the pump M' for supplying the tank H', the pump being capable of pumping either air or water, and shut-off valve $b^{23}$. The pump M' may be employed to pump either air or liquid. If a combination of hydraulic and pneumatic system is required, the shut-off valves $b^{14}$, $b^{16}$, $b^{21}$, $b^6$, and $b^7$ are closed and the liquid pumped into the tank H' through the pipe $b^9$. Then the valve $b^{13}$ is closed and the pump M' arranged to pump air, which will be supplied to the tank H' through the pipe $b^{10}$ by opening the valve $b^{14}$. If now the pump is required to feed the shop-supply $b^5$, the valves $b^6$ $b^7$ $b^{13}$ $b^{14}$ $b^{21}$ are closed and the valves $b^{23}$ and $b^{16}$ opened. By this arrangement of piping and valves any required system may be provided.

In Fig. 5 is shown a modification in the manner of arranging the pressure-tanks and supply-piping, wherein an auxiliary tank $H^{20}$ is employed to furnish an extra supply of compressed liquid or air. This auxiliary tank is shown connected to the tank H' by piping and valves, so that the liquid carried thereby under pressure may be utilized if the liquid in the tank H' becomes exhausted.

Having thus described my invention, what I claim as new is—

1. In an apparatus for handling locomotives or other heavy bodies, the approach, one or more sections of track adapted to register with said approach and mounted upon a frame, a hydraulic "jack" mounted to elevate or depress said track-section frame, a series of hydraulic "jacks" mounted to elevate and depress the article being handled by said apparatus, a supply-tank for the compressed liquid, or air, piping connecting said supply-tank with said track-section "jack," piping said supply-tank with said load-lifting "jacks," and valves connected into said piping, whereby the liquid or air under pressure may be conducted to either one of said series of "jacks," or between said series of "jacks" independently of said supply-tank, and means thereby provided for utilizing the load to assist in the operation, substantially as set forth.

2. In an apparatus for handling locomotives and other heavy bodies, the approach, one or more sections of track adapted to register with said approach and mounted upon a frame, and means whereby said frame may be adjusted vertically, a shoe having an inclined surface and adapted to support the end of said track-section, a section of said approach being adjustable and adapted to be adjusted by said shoe, to keep said approach and track-section at a uniform level, substantially as set forth.

3. In an apparatus for handling locomotives or other heavy bodies, a table to receive the locomotive or other object to be handled, a series of hydraulic or pneumatic "jacks" adapted to elevate and depress said table, said "jacks" having an enlarged bore at the upper part and a piston-head fitting said enlarged bore, means for supplying compressed liquid or air below said piston, and means for supplying compressed liquid or air above the piston, substantially as set forth.

4. In an apparatus for handling locomotives or other heavy bodies, the approach, two sections of track arranged at right angles and mounted to be revolved, and means whereby said frame may be adjusted vertically, and counterpoises adjustably connected to one or both of said track-sections, substantially as set forth.

5. In an apparatus for handling locomotives or other heavy bodies, the approach provided with a track, one or more sections of track adapted to register with the track-rails on said approach, and mounted upon a frame, a hydraulic "jack" mounted to elevate or depress said track-section frame, a series of hydraulic "jacks" mounted to elevate and depress the article being handled by said apparatus, said series of "jacks" being adjustable longitudinally of the tracks, a supply-tank for the compressed air, piping connecting said supply-tank with said track-section "jack," piping connecting said supply-tank with said load-lifting "jacks," and valves connected into said piping, whereby the liquid or air under pressure may be conducted to either one of said series of "jacks," or between said series of "jacks" independently of said supply-tank, and means provided for utilizing the load to assist in the operation, and the load-lifting "jacks" adapted to be adjusted to the length of the article being handled, substantially as and for the purpose set forth.

In testimony whereof I hereunto set my hand in the presence of two subscribing witnesses.

WILLIAM R. WOOD.

In presence of—
C. N. WOODWARD,
AUG. A. SAUTTER.